Patented May 9, 1939

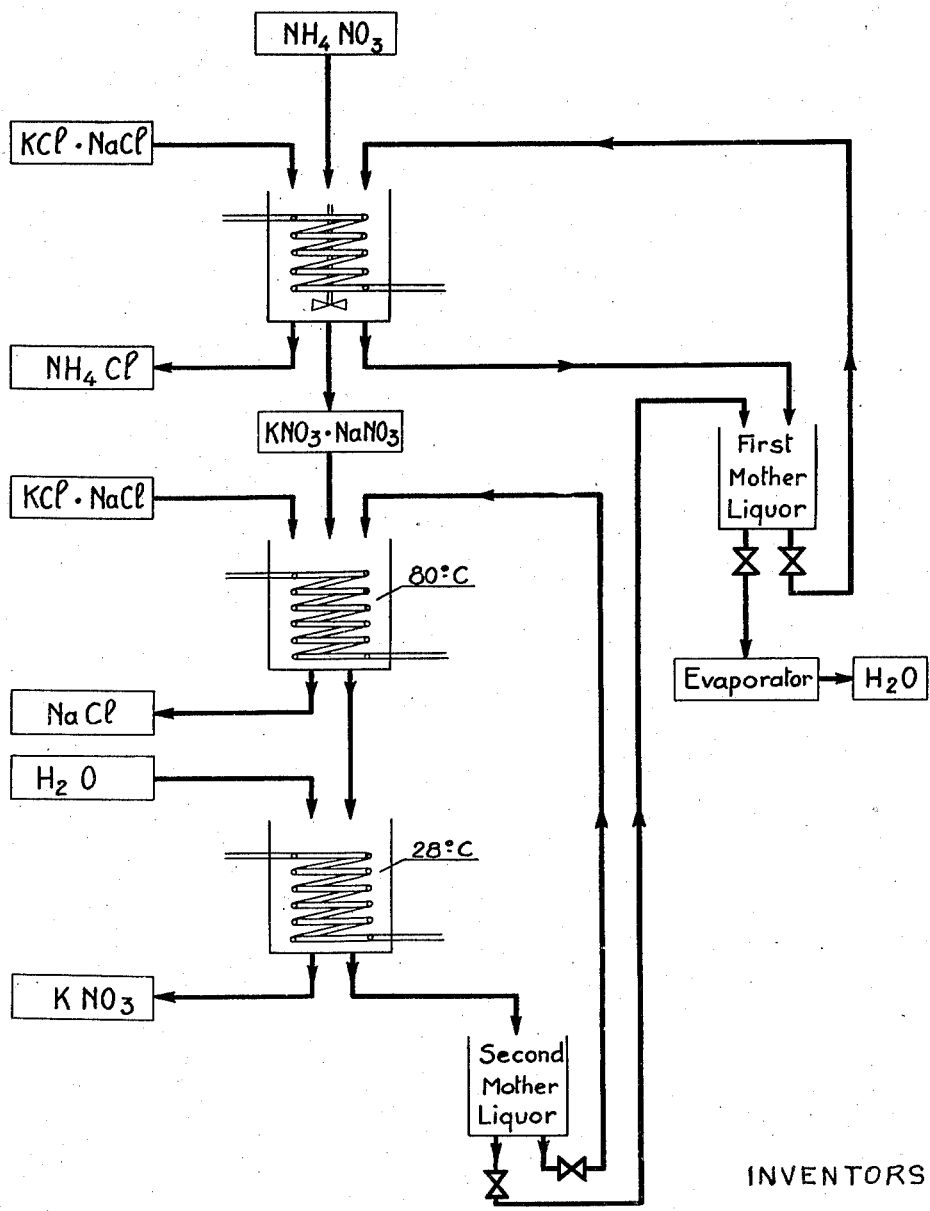

2,157,260

UNITED STATES PATENT OFFICE 2,157,260

PROCESS FOR THE PREPARATION OF POTASSIUM NITRATE

Jean Dessèvre, Louis Durepaire, and Bernard Quanquin, Paris, France

Application May 27, 1937, Serial No. 145,150
In France June 8, 1936

3 Claims. (Cl. 23—102)

A process is already known for the obtaining of a mixture of potassium nitrate and sodium nitrate, possibly containing a small proportion of ammonium nitrate and ammonium chloride; such a mixture may for instance be collected after a double decomposition between ammonium nitrate and potassium chloride, either pure or mixed with sodium chloride (sylvinite).

The present invention has for its object to prepare potassium nitrate in the practically pure state by the use of such a mixture of nitrates, this being effected not only by separating the potassium nitrate from the mixture, but also by converting the sodium nitrate into potassium nitrate.

The surprising observation has been made that in spite of the possible presence of ammoniacal salts (chloride or nitrate), even in considerable proportion, it is possible to convert the sodium nitrate into potassium nitrate, within the mixture itself, by means of potassium chloride, either alone or accompanied by sodium chloride (sylvinite).

This makes it possible to obtain in the form of practically pure potassium nitrate, the whole of the nitrogen in nitric form which is contained in the mixture, in spite of the presence, in the mother-liquor, of more than 10 grams molecule of ammoniacal salts per 1,000 grams of water.

The process in conformity with the invention consists in placing the mixture of nitrates in the mother-liquor resulting from a preceding operation, in adding potassium chloride, or sylvinite, and in heating for a suitable time. After the conversion, the sodium chloride thus formed is removed, then water is added and the whole is allowed to cool.

The pure crystallized potassium nitrate may be removed, and the proper quantity of mother-liquor is brought to the starting point of the cycle, the remainder being separated for any possible further use, and chiefly in the cycle of double decomposition which affords the mixture of nitrates.

The quantity of water to be added during the process in conformity with the invention should be just sufficient to maintain in solution, during the cooling, the ammoniacal salts contained in the original mixture, and the sodium salts which tend to precipitate.

The quantity of potassium chloride, KCl, or of sylvinite employed for the conversion may vary considerably without producing any great changes in the manufacture.

This quantity is especially determined by the proportion of salts, sodium chloride and potassium nitrate, which it is desired to obtain.

The drawing illustrates one embodiment of the process.

Example

To 2,150 litres of mother-liquor obtained from a preceding double decomposition between ammonium nitrate and sylvinite, with a specific gravity of 41° B. and containing:

| | Kgs. |
|---|---|
| $H_2O$ | 1,200 |
| $NH_4NO_3$ | 380 |
| $KNO_3$ | 407 |
| $NaNO_3$ | 271 |
| $NaCl$ | 225 | there are added 650 kgs. of ground sylvinite (having a proportion equivalent to 27% of $K_2O$) and 1,920 kgs. of a mixture of nitrates obtained by double decomposition between ammonium nitrate and sylvinite directly and without washing, and containing:

| | Percent |
|---|---|
| $H_2O$ | 1.4 |
| $KNO_3$ | 45.0 |
| $NaNO_3$ | 38.0 |
| $NH_4NO_3$ | 6.2 |
| $NH_4Cl$ | 9.4 |

This is heated at 80° C. for 30 minutes, and one proceeds, at about this temperature, that is, from 75° to 80°, with the separation of the solid product, for instance by a centrifugal treatment.

After washing with 120 litres of water, there are removed 580 kgs. of sodium chloride accompanied by the insoluble impurities of the raw material, but not containing measurable traces of potassium, of nitrogen in the nitric state, nor of ammoniacal nitrogen.

The mother liquor which is collected after the centrifugal treatment and to which is added the water from the preceding washing, has also added to it 360 litres of water, and is then subjected to a cooling to 28° C. in 30 minutes.

There are then removed, by centrifugal treatment or otherwise, and after washing with 120 litres of water, 1,090 kgs. of potassium nitrate having the following composition in the dry state:

| | Per cent |
|---|---|
| $KNO_3$ | 95.7 |
| $NH_4NO_3$ | 3.5 |
| $NH_4Cl$ | 0.8 | that is, containing only 4.3% of impurities.

A part of the mother-liquor or the washing water, containing 600 litres of water, is removed from the cycle, and the remainder is again utilized for a subsequent operation of conversion.

The portion of the mother-liquor removed from the cycle may be treated by any suitable means, for the recovery of the salts which it contains, but it is particularly advantageous to employ it for the preparation of the mother-liquors required for the process of the double decomposition between the ammonium nitrate and the chlorides of potassium and sodium.

W claim:

1. A process of manufacturing potassium nitrate, comprising treating ammonium nitrate with a mixture of potassium chloride and sodium chloride in a solution saturated with these salts, separating a mixture of potassium nitrate and sodium nitrate, treating the latter mixture with a mixture of potassium chloride and sodium chloride in a solution saturated with these salts, heating the mass, recovering the sodium chloride precipitated, diluting the remaining solution, cooling the diluted solution, and recovering the crystallized potassium nitrate.

2. A process of manufacturing potassium nitrate, comprising treating ammonium nitrate with a mixture of potassium chloride and sodium chloride in a first saturated mother-liquor obtained from a preceding double decomposition between ammonium nitrate, potassium chloride and sodium chloride, separating a mixture containing potassium nitrate and sodium nitrate, treating the latter mixture with a mixture of potassium chloride and sodium chloride in a second saturated mother-liquor obtained from a preceding conversion of sodium nitrate into potassium nitrate by means of a mixture of potassium chloride and sodium chloride, heating said second mother-liquor, recovering the sodium chloride precipitated, diluting the remaining solution with water, cooling the diluted solution, and recovering the crystallized potassium nitrate.

3. A process of manufacturing potassium nitrate, comprising treating ammonium nitrate with a mixture of potassium chloride and sodium chloride in a first saturated mother-liquor obtained from a preceding double decomposition between ammonium nitrate, potassium chloride and sodium chloride, separating a mixture containing potassium nitrate and sodium nitrate, treating the latter mixture with a mixture of potassium chloride and sodium chloride in a second saturated mother-liquor obtained from a preceding conversion of sodium nitrate into potassium nitrate by means of a mixture of potassium chloride and sodium chloride, heating said second mother-liquor, recovering the sodium chloride precipitated, diluting the remaining solution with water, cooling the diluted solution, recovering the crystallized potassium nitrate, saving a part of the remaining mother-liquor for adding to the first mother-liquor, and utilizing the other part as the second mother-liquor.

JEAN DESSÈVRE.
LOUIS DUREPAIRE.
BERNARD QUANQUIN.